(12) United States Patent
Coleman et al.

(10) Patent No.: US 7,591,410 B2
(45) Date of Patent: Sep. 22, 2009

(54) METHODS FOR EXTENDING THE LIFE OF ALLOY STEEL WELDED JOINTS BY ELIMINATION AND REDUCTION OF THE HAZ

(75) Inventors: Kent K. Coleman, Concord, NC (US); David Wayne Gandy, Concord, NC (US); Ramaswamy Viswanathan, Saratoga, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 43 days.

(21) Appl. No.: 12/025,827

(22) Filed: Feb. 5, 2008

(65) Prior Publication Data

US 2008/0156402 A1 Jul. 3, 2008

Related U.S. Application Data

(62) Division of application No. 10/972,249, filed on Oct. 22, 2004, now Pat. No. 7,371,988.

(51) Int. Cl.
*B23K 35/24* (2006.01)

(52) U.S. Cl. .................. 228/225; 228/226; 228/229; 228/232; 228/256; 228/262.4; 228/262.41

(58) Field of Classification Search .................. None
See application file for complete search history.

(56) References Cited

U.S. PATENT DOCUMENTS 2,759,249 A * 8/1956 Eberle .................. 428/638

2,856,281 A 10/1958 Cremer et al.
2,870,323 A 1/1959 Roper
2,938,107 A 5/1960 Pease (Continued)

FOREIGN PATENT DOCUMENTS

DE 2238688 A 2/1974

(Continued)

OTHER PUBLICATIONS

Office Action mailed Nov. 21, 2006 for U.S. Appl. No. 10/839,863.

(Continued)

*Primary Examiner*—Kiley Stoner
(74) *Attorney, Agent, or Firm*—Kilpatrick Stockton LLP

(57) ABSTRACT

In one embodiment, the present invention provides a method for welding together two metal pieces, comprising buttering a surface of a first metal piece with a first nickel-based filler metal at a thickness sufficient to isolate a heat-affected zone in the first metal piece from subsequent welding; heat-treating at least the heat-affected zone in the first metal piece; buttering a surface of a second metal piece with a second nickel-based filler metal having the same composition as the first nickel-based filler metal and at a thickness sufficient to isolate a heat-affected zone in the second metal piece from subsequent welding; heat-treating at least the heat-affected zone in the second metal piece; and welding the heat-treated first buttered surface to the heat-treated second buttered surface with a third nickel-based filler metal having the same composition as the first and second nickel-based filler metals.

18 Claims, 2 Drawing Sheets

U.S. PATENT DOCUMENTS

| | | | |
|---|---|---|---|
| 3,194,642 A * | 7/1965 | Bates et al. | 428/637 |
| 3,559,277 A * | 2/1971 | Marianeschi | 228/173.1 |
| 3,596,053 A | 7/1971 | Kameda et al. | |
| 4,110,514 A | 8/1978 | Nicholson | |
| 4,255,247 A | 3/1981 | Oda et al. | |
| 4,402,742 A | 9/1983 | Pattanaik | |
| 4,487,744 A | 12/1984 | DeBold et al. | |
| 4,653,684 A | 3/1987 | Saito et al. | |
| 4,702,406 A * | 10/1987 | Sullivan et al. | 228/200 |
| 4,703,885 A | 11/1987 | Lindgren et al. | |
| 4,745,037 A | 5/1988 | DeCristofaro et al. | |
| 4,814,236 A * | 3/1989 | Qureshi et al. | 428/678 |
| 4,900,638 A | 2/1990 | Emmerich | |
| 5,422,071 A | 6/1995 | Kiser | |
| 5,425,912 A | 6/1995 | Smith et al. | |
| 5,914,055 A * | 6/1999 | Roberts et al. | 219/76.15 |
| 6,129,999 A | 10/2000 | Ueda et al. | |
| 6,162,551 A | 12/2000 | Watanabe | |
| 6,242,113 B1 | 6/2001 | Kiser | |
| 6,257,882 B1 | 7/2001 | Wyllie | |
| 6,489,584 B1 | 12/2002 | Kelly | |
| 6,528,012 B2 | 3/2003 | Nishimoto et al. | |
| 6,673,169 B1 | 1/2004 | Peterson et al. | |
| 6,702,906 B2 | 3/2004 | Ogawa et al. | |
| 7,217,905 B2 | 5/2007 | Hardesty et al. | |
| 2001/0038001 A1 | 11/2001 | Morikage et al. | |
| 2004/0079453 A1 | 4/2004 | Groh et al. | |
| 2005/0247763 A1 | 11/2005 | Coleman et al. | |
| 2005/0271542 A1 | 12/2005 | Frankel et al. | |
| 2006/0060640 A1* | 3/2006 | Pao et al. | 228/254 |
| 2007/0221705 A1* | 9/2007 | Arnett et al. | 228/101 |

FOREIGN PATENT DOCUMENTS

JP          58128277 A   *   7/1983

OTHER PUBLICATIONS

Office Action mailed Apr. 19, 2006 for U.S. Appl. No. 10/839,863.
Office Action mailed Aug. 23, 2005 for U.S. Appl. No. 10/839,863.
Response mailed to USPTO on Apr. 23, 2007 for U.S. Appl. No. 10/839,863.
Response mailed to USPTO on Aug. 21, 2006 for U.S. Appl. No. 10/839,863.
Amendment mailed to USPTO on Jan. 23, 2006 for U.S. Appl. No. 10/839,863.
Office Action mailed Feb. 16, 2007 for Swedish Patent Application Serial No. 0601285-0.
Response to Office Action mailed Feb. 16, 2007 sent to Swedish Patent Office on Jun. 18, 2007 for Swedish Patent Application Serial No. 0601285-0.
Office Action mailed Nov. 21, 2006 for U.S. Appl. No. 10/972,249.
Response mailed to USPTO on Dec. 21, 2006 for U.S. Appl. No. 10/972,249.
Notice of Allowance mailed Jul. 11, 2007 for U.S. Appl. No. 10/972,249.
Request for Continued Examination filed with USPTO on Sep. 7, 2007 for U.S. Appl. No. 10/972,249.
Amendment and Response Under 37 CFR 1.114 filed with USPTO on Sep. 7, 2007 for U.S. Appl. No. 10/972,249.
Notice of Allowance mailed Oct. 31, 2007 for U.S. Appl. No. 10/972,249.
International Search Report mailed Jul. 24, 2006 corresponding to PCT/US05/33836.
Written Opinion of the International Searching Authority mailed Jul. 24, 2006 corresponding to PCT/US05/33835.

* cited by examiner

METHODS FOR EXTENDING THE LIFE OF ALLOY STEEL WELDED JOINTS BY ELIMINATION AND REDUCTION OF THE HAZ

PRIORITY CLAIM

The present application is a divisional application of U.S. patent application Ser. No. 10/972,249, filed Oct. 22, 2004, now U.S. Pat. 7,371,988. The disclosure of U.S. patent application Ser. No. 10/972,249 is hereby incorporated by reference in its entirety.

BACKGROUND OF THE INVENTION

1. Field of the Invention

The invention relates generally to welding. More specifically, the invention is directed to a method of welding metal pieces together using buttering and heat treating techniques to avoid post-weld heat treatment and to reduce or eliminate the heat-affected zone.

2. Description of Related Art

There are two aspects of welding that increase costs of welding and that lead to failure of welded components: the presence of a heat-affected zone (HAZ) and post-weld heat treatment (PWHT), which is used to address the problems presented by the HAZ. As is known in the art, the heat from a weld creates a HAZ in the metal adjacent to the weld. The creation of this HAZ has adverse metallurgical effects, such as the creation of notch effects or grain growth, which cause a weakening of the metal in the HAZ. While new alloys, for example, 2-12% chromium content by weight, have been developed to provide higher strengths for high temperature pressure applications compared to alloys and steels previously used, failures that limit the useful life of components produced from these materials tend to occur next to welds in the HAZ. In addition, attempts to develop filler materials to strengthen welds and reduce the effects of the HAZ have not been satisfactory.

Another method used to improve the metallurgical properties in the HAZ is a PWHT. The American Society of Mechanical Engineers (ASME) Boiler and Pressure Vessel Code requires that welding applications of low alloy steel piping and pressure vessels be subjected to a PWHT to achieve toughness, tensile and hardness properties in the weld HAZ. However, PWHT tends to be an expensive process requiring considerable time to perform. PWHT typically requires heating the welded metal piece to a temperature that is just below the first transformation temperature for the material. ASME-mandated PWHT of a high temperature material containing 2% chromium requires the material to be held at 1350° F. for one hour for each inch of material thickness. The ramp rate at which the temperature of the material can be raised to the holding temperature and cooled back to room temperature must be closely controlled and requires several hours to complete. Typical PWHT operations on a 2" thick pipe manufactured from this material, including set up, time to raise the material to temperature, hold time, and cooling time can require 24 hours. Components with multiple welds may require several PWHT operations.

Fabricators of components generally perform such PWHT in a large oven that allows for several weld joints to be tempered concurrently. The physical size of the oven obviously limits the size of the components that can be tempered. Therefore, some PWHT procedures must be performed in the field or at the job site. In these cases, parts are welded together and then transferred to the field where a PWHT is performed. PWHT in such larger components are generally performed utilizing resistance pads or induction heat treatment equipment. As such, the number of weld joints that can receive PWHT at one time is limited by the availability of power and PWHT equipment. On large construction jobs, scheduling of PWHT also becomes an important task.

Moreover, simply moving components in the fabrication shop to the oven, storage, other fabrications areas or to the job site can result in failures in welds and HAZ areas. Assembly of components at the job site presents additional challenges to achieve acceptable PWHT. Air flow currents around the components, including, for example, both external and internal currents from wind and chimney effects, can result in the material not reaching sufficient temperature during PWHT to develop the required properties. Special care to support the components is also required during PWHT operations since the strength of the material is greatly reduced by the high temperature of the PWHT operation.

Even with PWHT, failures still occur near the weld or in the HAZ. Therefore, a need exists for an improved method of welding that reduces the effects of the HAZ and eliminates the need for PWHT.

SUMMARY OF THE INVENTION

The present invention provides a method for welding together two metal pieces, comprising buttering a surface of a first metal piece with a first nickel-based filler metal at a thickness sufficient to isolate a heat-affected zone in the first metal piece from subsequent welding to produce a first buttered surface; heat-treating at least the heat-affected zone in the first metal piece after buttering of the surface of the first metal piece to produce a heat-treated first buttered surface; buttering a surface of a second metal piece with a second nickel-based filler metal having the same composition as the first nickel-based filler metal and at a thickness sufficient to isolate a heat-affected zone in the second metal piece from subsequent welding to produce a second buttered surface; heat-treating at least the heat-affected zone in the second metal piece after buttering of the surface of the second metal piece to produce a heat-treated second buttered surface; and welding the heat-treated first buttered surface to the heat-treated second buttered surface with a third nickel-based filler metal having the same composition as the first and second nickel-based filler metals.

The method of the present invention may be used to weld both similar and dissimilar metals. Preferably, the method of the present invention is used to weld a martensitic stainless steel to either a ferritic stainless steel, an austenitic stainless steel or another martensitic stainless steel.

The method of the present invention allows for sub-component pieces to be welded together either in the shop or at a job site without the need for post-weld heat treatment. This provides for better utilization of equipment and improved manpower scheduling while reducing the amount of time required for field assembly. The methods of the invention described herein can be utilized to substantially reduce the costs and time required to join low alloy piping and/or pressure vessel materials and is applicable to a variety of different welding processes.

These and other features and benefits of the invention will appear from the following description from which the preferred embodiments are set forth in detail in conjunction with the accompanying drawings.

DETAILED DESCRIPTION OF THE INVENTION

The present invention provides an improved method for welding that reduces or eliminates the effects caused by the formation of the HAZ during welding and eliminates the need for PWHT. Generally, the present invention provides a method for preparing a first metal piece to be welded using a buttering technique with a nickel-based filler material followed by a PWHT that either tempers the HAZ or eliminates the HAZ through normalization. A second metal piece is also prepared in a similar or identical fashion. The two pieces are then welded together, either in the shop or in the field, without the need for PWHT.

Figure 1:
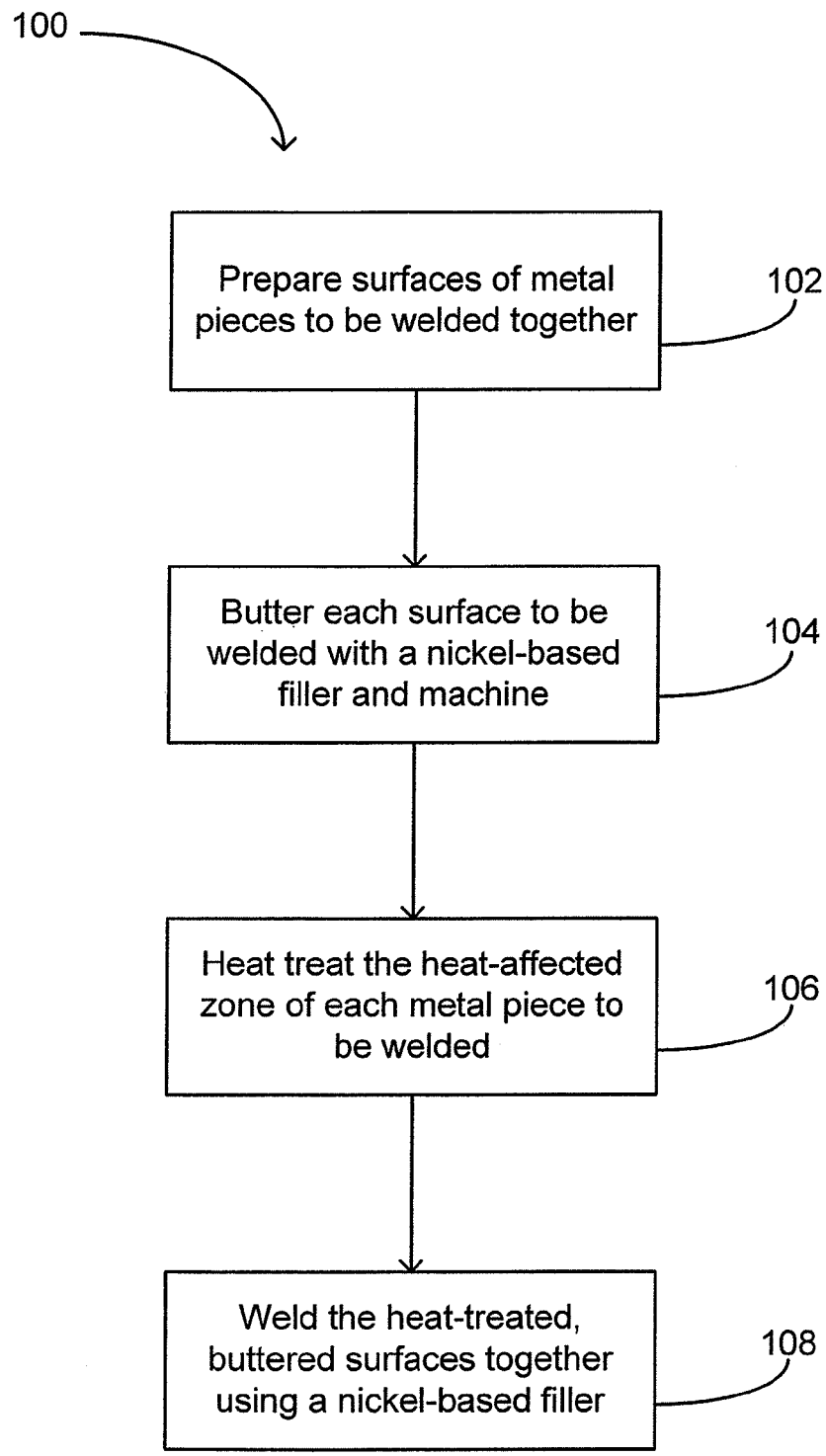
FIG. 1 is a process flow diagram according to one embodiment of the present invention.

FIG. 1 is a process flow diagram according to one embodiment of the present invention. The process 100 is a method for welding two metal pieces together. It should be appreciated that the metal pieces to be welded together may be similar or dissimilar metals. For example, low alloy ferritic steels, which have less than 12% chromium by weight, may be joined together. Also, a low alloy steel having less than 12% chromium by weight, such as a ferritic steel, may be joined to a stainless steel having 12% or more chromium by weight, such as an austenitic stainless steel. In a preferred embodiment, the present invention is used to join a martensitic stainless steel to either a ferritic stainless steel, an austenitic stainless steel or another martensitic stainless steel. Another preferred embodiment includes the joining of 9Cr alloys to other 9Cr alloys, other ferritic alloys, or austenitic alloys, where 9Cr alloys may include, for example, straight 9Cr, P91, P92, etc.

It should be appreciated that the use of the term "low alloy" steel refers to a steel similar to carbon steel, which are steels having less than approximately 1.65% manganese, 0.60% silicon or 0.60% copper, except that elements such as chromium, molybdenum, cobalt, columbium, titanium, etc. have been added to increase its hardenability and strength. Examples of low alloy steels include 1¼ Cr-½ Mo (T11 or P11), 2¼ Cr-1 Mo (T22 or P22) and a variety of other ASTM-type alloy steels such as ferritic and martensitic steels. The use of the term "ferritic" refers to steels that exhibit a predominately ferritic microstructure at room temperature and are not hardenable with heat-treatments. The use of the term "stainless" refers to ferrous alloys that contain a minimum of 10% aluminum by weight and includes, for example, austenitic stainless steel, ferritic stainless steel, martensitic stainless steel and precipitation-hardened stainless steel. The use of the term "austenitic" stainless steel refers to a stainless steel alloyed with nickel or manganese and nitrogen to provide an austenitic structure at room temperature, such as the 300-series stainless steels, including, for example, 304, 316, 321 and 347. The use of the term "martensitic" stainless steel refers to a stainless steel with the addition of carbon that exhibits a predominantly martensitic microstructure at room temperature and is hardenable by heat treatment, such as the 400-series stainless steels, including, for example, 410, 420 and 440. Ferritic stainless steels, such as a 430 or 446 steel, contain a minimum of 10% chromium by weight and has a room temperature microstructure of ferrite and carbide. Typically, these alloys do not harden by heat treatment.

In the first step 102, each of the metal pieces to be welded together is prepared for welding. It should be appreciated that reference to a "metal piece" refers to any metal piece to be welded. For example, a metal piece may be a sub-component part that is to be welded to another sub-component part to form a desired final component or piece of equipment. Therefore, the use of the term "metal piece" is intended to generically cover any type or shape of metal to be welded. The preparation done in this step 102, may include, various process steps or procedures performed on a metal piece to prepare it for welding. For example, the metal piece, or the particular surface of the metal piece, may be machined into a particular shape by using a lathe. The surface of the metal piece may also be ground, which is often performed after arc-gouging, or air-arcing, to remove metal. Electro-discharge machining may also be used for precision work; however, the process is typically slow.

In the next step 104, each surface of each metal piece to be subsequently welded to another metal piece is buttered using a nickel-based filler. Specifically, a nickel-based filler is welded to the particular surface of each piece of metal that will later be welded together. The application of this nickel-based filler to the surface of each metal piece may be referred to as a "butter layer." Preferably, the nickel-based filler comprises at least 10% or more nickel by weight and more preferably comprises approximately 40-70% nickel by weight, and even more preferably 40-60% nickel by weight. Otherwise, the filler may be any material known in the art, which will depend, in part, on the composition of the metal pieces being welded together. Examples of some preferred filler materials capable of being used in the present invention for buttering and welding of dissimilar metals include INCONEL Welding Electrode 182, INCONEL Filler Material 82 and INCO-WELD A Electrode. It should be appreciated that preferably, the composition of the nickel-based filler is the same for both of the metal pieces or the butter layers on each.

The actual conditions and techniques that may be used to apply or weld this butter layer are well known to those of skill in the art. Specifically, any welding procedures or techniques currently available may be used to apply the butter layer. However, the butter layer should be applied at a thickness sufficient to isolate the HAZ formed during buttering from heat produced during subsequent welding. In other words, the butter layer should be thick enough so that the HAZ is not affected by subsequent welding operations, i.e., upon welding of the two metal pieces together.

Additionally, in the step 104, after application of the butter layer, each metal piece may again be machined to the appropriate weld geometry in preparation for final welding between the two metal pieces. Therefore, if such machining is performed, the thickness of the butter layer should be sufficient to allow for a reduction in its thickness as a result of such machining. The thickness of the butter layer may vary depending on which type of welding process, the filler composition and the alloy composition is used.

In the next step 106, each metal piece is heat-treated. The particular heat treatment applied should be sufficient to heat-treat at least the HAZ in each metal piece. In other words, each metal piece should be subject to heat such that at least the HAZ in each is heated to the desired temperature to achieve the desired affect. In one embodiment, the heat treatment comprises heating each metal piece, or at least its HAZ, to a temperature sufficient to normalize the HAZ. For example, in one embodiment, such heat treatment comprises heating each metal piece above the $A_{C3}$ transformation temperature, which varies depending on the alloy and its corresponding chemistry. The normalization of the HAZ results in restoration of the HAZ to its virgin or original base metallurgical condition. Preferably, such heat treatment would be performed in an oven to obtain better control than other heating methods or equipment.

It should be appreciated that such normalizing heat treatment may be utilized in those cases where the metal pieces are both low alloy metals having a chromium content of approximately 2-12% by weight. Such normalizing heat treatment may be utilized when each of the metal pieces comprises a low alloy ferritic steel piece. Such normalizing heat treatment may be utilized when one of the metal pieces comprises a low alloy metal piece and the other metal piece comprises a stainless steel piece. Such normalizing heat treatment may be utilized when one of the metal pieces comprises a low alloy ferritic steel piece and the other metal piece comprises an austenitic stainless steel piece. Such normalizing heat treatment may also be utilized when one of the metal pieces comprises a martensitic stainless steel piece and the other metal piece comprises either a of low alloy ferritic steel, austenitic stainless steel or martensitic stainless steel.

In another embodiment, the heat treatment comprises heating each metal piece to a temperature that is sufficient to temper the HAZ to obtain adequate toughness, tensile and hardness properties in the HAZ. For example, in one embodiment such heat treatment comprises heating each metal piece above the $A_{C1}$ transformation temperature, which varies depending on the alloy and its corresponding chemistry, but below the $A_{C3}$ temperature.

It should be appreciated that such tempering heat treatment may be utilized when one of the metal pieces comprises a low alloy metal piece and the other metal piece comprises a stainless steel piece. Such tempering heat treatment may be utilized when one of the metal pieces comprises a low alloy ferritic steel piece. For example, such tempering heat treatment may be utilized when one of the metal pieces comprises a martensitic stainless steel piece and the other metal piece comprises a low alloy ferritic steel. It should be appreciated that in some cases it may be advantageous to use the normalizing heat treatment for one metal piece and the tempering heat treatment for the other metal piece.

It should be appreciated that the advantage of heat treating each metal piece before they are welded together avoids the need for PWHT. Therefore, in the case where the metal pieces comprise sub-components of particularly large component, heat-treating the individual sub-components may be easier than having to use PWHT for the entire finished component or piece of equipment. As such, expensive field PWHT may be avoided. Further, it should be appreciated that such heat treatment may be applied in the shop or in the field.

Additionally, after heat-treating each metal piece in the step 106, each metal piece may again be machined to the appropriate weld geometry in preparation for final welding between the two metal pieces. Therefore, if such machining is performed, the thickness of the butter layer should be sufficient to allow for a reduction in its thickness as a result of such machining. The thickness of the butter layer may vary depending on which type of welding process, the filler composition and the alloy composition is used.

In the next step 108, each of the heat-treated buttered metal pieces are welded together using a nickel-based filler. As discussed above, the nickel-base filler comprises at least 10% or more nickel by weight and more preferably comprises approximately 40-70% nickel by weight, and even more preferably 40-60% nickel by weight. Otherwise, the filler may be any material known in the art, which will depend, in part, on the composition of the metal pieces being welded together. Examples of some preferred filler materials capable of being used in the present invention for buttering and welding of dissimilar metals include INCONEL Welding Electrode 182, INCONEL Filler Material 82 and INCO-WELD A Electrode. Preferably, the nickel-based filler used to weld the two metal pieces together is the same as the nickel-based filler used to generate the buttered layers.

One of skill in the art will appreciate that any method or techniques known in the art may be used to weld the two metal pieces together. Similarly, any equipment known in the art may be used as well. It should be appreciated that this welding operation would not require a subsequent PWHT as adequate properties have already been developed in the respective HAZs in each of the metal pieces. Further, the nickel-based filler provides adequate metallurgical properties for this weld. Therefore, the two welded metal pieces may be placed in service without having to use PWHT.

Figure 2A:
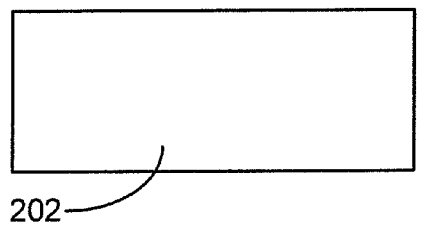
FIGS. 2A-2C illustrate the welding of two metal pieces according to one embodiment of the present invention.
Figure 2A:
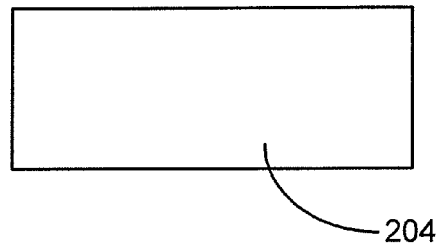
Figure 2B:
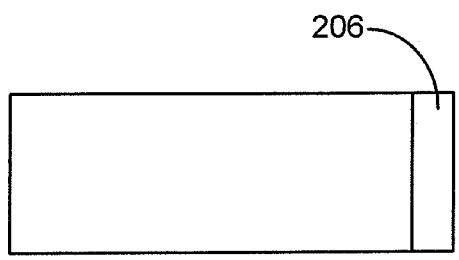
Figure 2B:
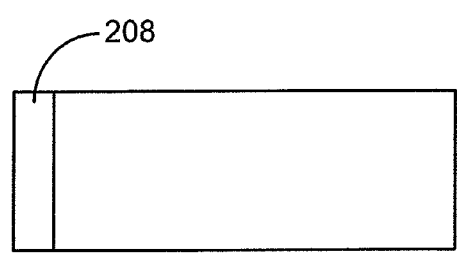
Figure 2C:
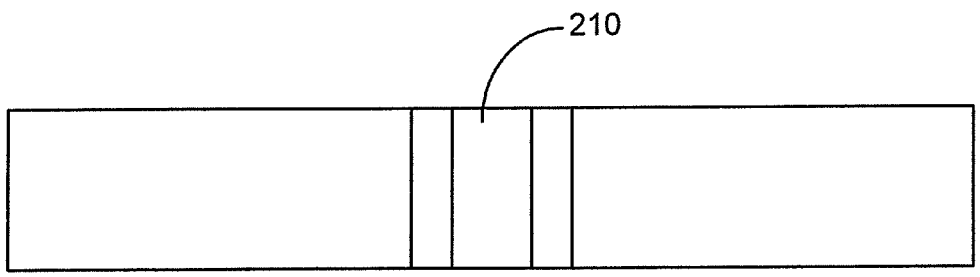

FIGS. 2A-2C illustrate the welding of two metal pieces according to one embodiment of the present invention. FIG. 2A illustrates two metal pieces 202, 204 to be welded. As noted above in connection with FIG. 1, each metal piece may be prepared according to preparation methods known in the art, such as machining. FIG. 2B illustrates the application of the butter layers 206, 208 to each of the metal pieces. In this particular case, the butter layers 206, 208 are applied to the end surfaces of each of the metal pieces 202, 204. As described above in connection with FIG. 1, each of these metal pieces 202, 204 having butter layers 206, 208 would then be heat treated, either through a normalization heat treatment or a tempering heat treatment. In addition, each metal piece could be further processed by machining to achieve the desired surface shape. FIG. 2C illustrates the results of the final welding step wherein a filler 210 is used to weld the butter layers 206, 208, and, therefore, the two metal pieces 202, 204 together. Also as described above in connection with FIG. 1, the final welded component may be placed in service without the need for PWHT.

Various embodiments of the invention have been described. The descriptions are intended to be illustrative of the present invention. It will be apparent to one of skill in the art that modifications may be made to the invention as described without departing from the scope of the claims set out below. For example, it is to be understood that the invention may be applied to welding of both similar and dissimilar metal pieces. Furthermore, it is to be understood that although the invention has been described generically for welding of two metal pieces, the invention may be utilized in any application where metals are welded together. For example, the invention may be utilized within the power, chemical, petroleum, steel, transportation, and pulp and paper. More generally, any process wherein welding of a low alloy steel is employed may make use of this technology. Additionally, the invention may be used to weld a martensitic stainless steel to either a ferritic stainless steel, an austenitic stainless steel or another martensitic stainless steel.

What is claimed is:

1. A method for welding together two metal pieces, comprising:

buttering a surface of a first metal piece with a first nickel-based filler metal at a thickness sufficient to isolate a heat-affected zone in the first metal piece from subsequent welding to produce a first buttered surface;

heat-treating at least the heat-affected zone in the first metal piece after said buttering of the surface of the first metal piece to produce a heat-treated first buttered surface;

buttering a surface of a second metal piece with a second nickel-based filler metal having the same composition as the first nickel-based filler metal and at a thickness sufficient to isolate a heat-affected zone in the second metal piece from subsequent welding to produce a second buttered surface;

heat-treating at least the heat-affected zone in the second metal piece after said buttering of the surface of the second metal piece to produce a heat-treated second buttered surface; and welding the heat-treated first buttered surface to the heat-treated second buttered surface with a third nickel-based filler metal having the same composition as the first and second nickel-based filler metals.

2. The method of claim 1, wherein the first, second and third nickel-based filler metals each comprise a nickel content of greater than 10% by weight.

3. The method of claim 2, wherein the nickel content is approximately 40-60% by weight.

4. The method of claim 1, wherein each of said heat-treatings comprise heat-treating at a temperature sufficient to normalize the heat-affected zone in each of the first and second metal pieces.

5. The method of claim 4, wherein each of said heat-treatings each comprise heat-treating at a temperature above a corresponding $A_{C3}$ temperature of each of said metal pieces.

6. The method of claim 4, wherein the first and second metal pieces each comprise a low alloy ferritic steel piece.

7. The method of claim 4, wherein the first metal piece comprises a low alloy metal piece and the second metal piece comprises a stainless steel piece.

8. The method of claim 7, wherein the first metal piece comprises a low alloy ferritic steel piece and the second metal piece comprises an austenitic stainless steel piece.

9. The method of claim 4, wherein the first metal piece comprises a martensitic stainless steel piece and the second metal piece is selected from the group consisting of low alloy ferritic steel, austenitic stainless steel and martensitic stainless steel.

10. The method of claim 1, wherein each of said heat-treatings comprise heat-treating at a temperature sufficient to temper the heat-affected zone in each of the first and second metal pieces.

11. The method of claim 10, wherein each of said heat-treatings each comprise heat-treating at a temperature above a corresponding $A_{C1}$ temperature of each of said metal pieces and below a corresponding $A_{C3}$ temperature of each of said metal pieces.

12. The method of claim 11, wherein the first metal piece comprises a low alloy metal piece and the second metal piece comprises a stainless steel piece.

13. The method of claim 12, wherein the first metal piece comprises a low alloy ferritic steel piece and the second metal piece comprises an austenitic stainless steel piece.

14. The method of claim 11, wherein the first metal piece comprises a martensitic stainless steel piece and the second metal piece is selected from the group consisting of low alloy ferritic steel, austenitic stainless steel and martensitic stainless steel.

15. The method of claim 1, wherein the first and second metal pieces each comprise a low alloy ferritic steel piece.

16. The method of claim 1, wherein the first metal piece comprises a low alloy metal piece and the second metal piece comprises a stainless steel piece.

17. The method of claim 16, wherein the first metal piece comprises a low alloy ferritic steel piece and the second metal piece comprises an austenitic stainless steel piece.

18. The method of claim 1, wherein the first metal piece comprises a martensitic stainless steel piece and the second metal piece is selected from the group consisting of low alloy ferritic steel, austenitic stainless steel and martensitic stainless steel.

* * * * *